United States Patent [19]

Glenn

[11] Patent Number: 5,388,173
[45] Date of Patent: Feb. 7, 1995

[54] METHOD AND APPARATUS FOR FORMING APERIODIC GRATINGS IN OPTICAL FIBERS

[75] Inventor: William H. Glenn, Vernon, Conn.

[73] Assignee: United Technologies Corporation, Hartford, Conn.

[21] Appl. No.: 169,796

[22] Filed: Dec. 20, 1993

[51] Int. Cl.[6] .............................................. G02B 6/34
[52] U.S. Cl. ........................................ 385/37; 359/10;
  359/34; 359/575; 359/900; 385/123; 385/129
[58] Field of Search ...................... 385/12, 37, 39, 123,
  385/124, 129, 130, 14; 359/10, 11, 15, 27, 34,
  35, 566, 569, 573, 575, 900

[56] References Cited

U.S. PATENT DOCUMENTS

| | | | |
|---|---|---|---|
| H474 | 6/1988 | Taylor | 385/37 X |
| 3,995,937 | 12/1976 | Baues et al. | 385/14 |
| 4,725,110 | 2/1988 | Glenn et al. | 359/900 X |
| 4,749,248 | 6/1988 | Aberson, Jr. et al. | 385/37 |
| 4,807,950 | 2/1989 | Glenn et al. | 385/123 |
| 5,006,716 | 4/1991 | Hall | 250/458.1 |
| 5,007,705 | 4/1991 | Morey et al. | 385/12 |

*Primary Examiner*—John D. Lee
*Attorney, Agent, or Firm*—Gerald L. DePardo

[57] ABSTRACT

A method and apparatus for simultaneously exposing an optical fiber 32, made of a material which has a refractive index that can be permanently changed by exposure to light of a predetermined intensity at a predetermined wavelength, to two writing light beams 268,272 which intersect and interfere in a predetermined region 30 of the fiber 32 so as to create an interference pattern along a longitudinal axis of the fiber 32, for a time long enough to form a permanent refractive index variation in the waveguide. Each of said two writing beams have a predetermined number of wavelengths, each wavelength being sufficiently different from each other so as to cause said refractive index variation to be an aperiodic variation. Also, each wavelength represents a Fourier component of the desired aperiodic refractive index variation.

21 Claims, 4 Drawing Sheets

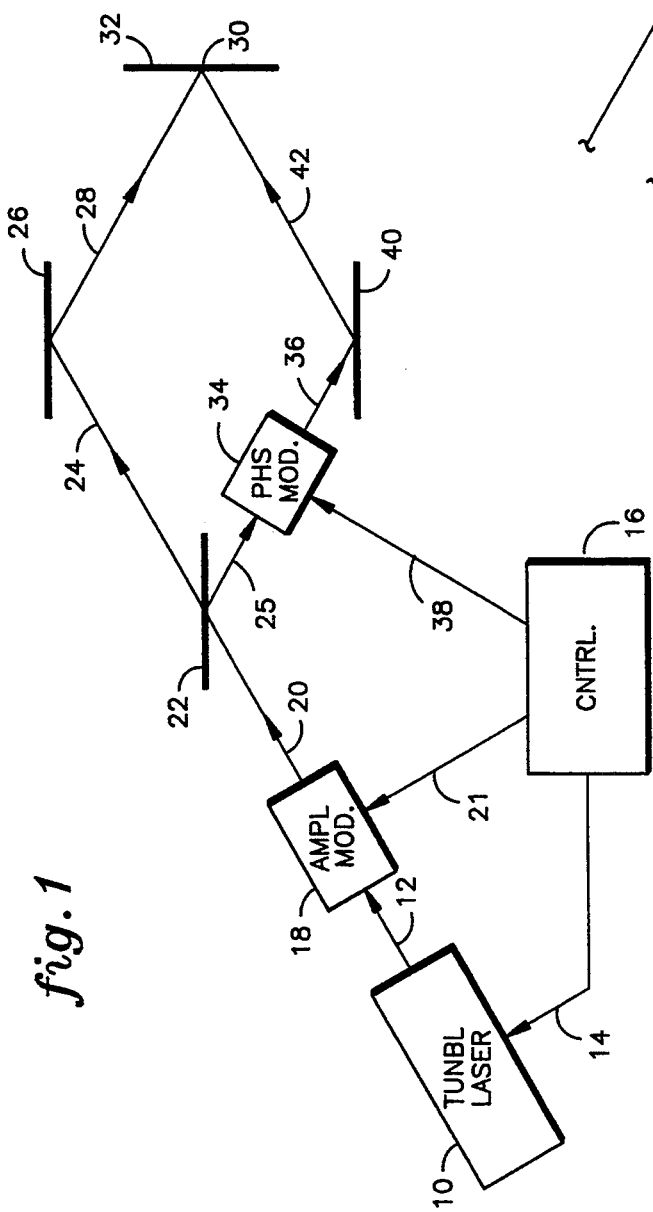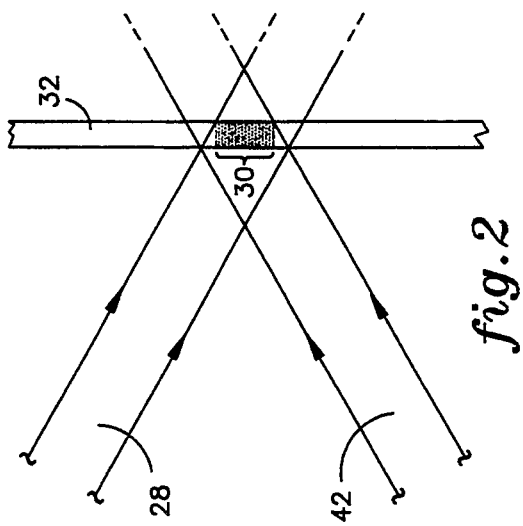

fig.4
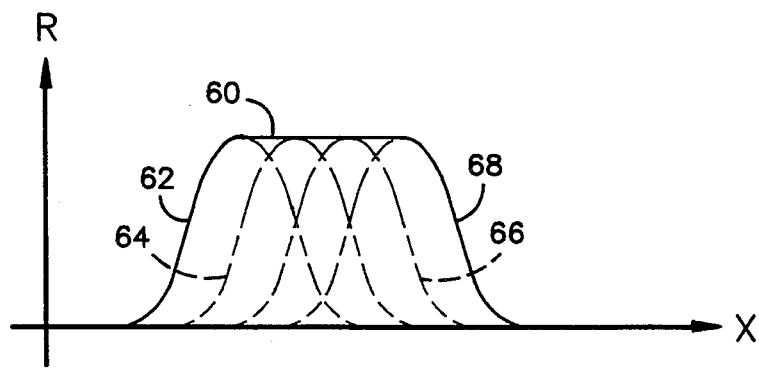
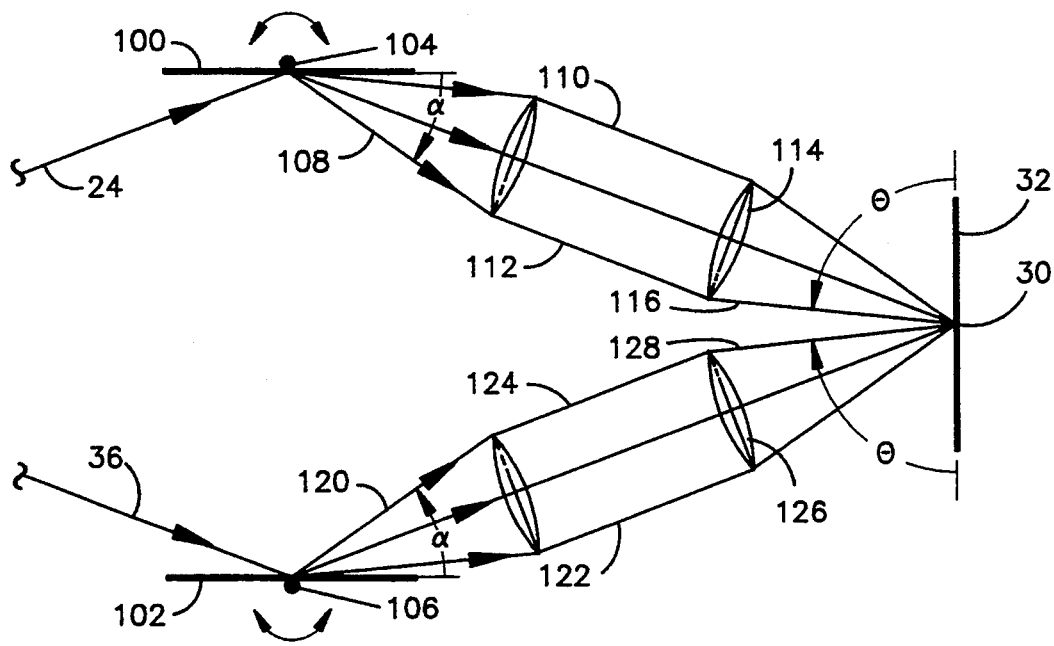
fig.5

*fig.6*
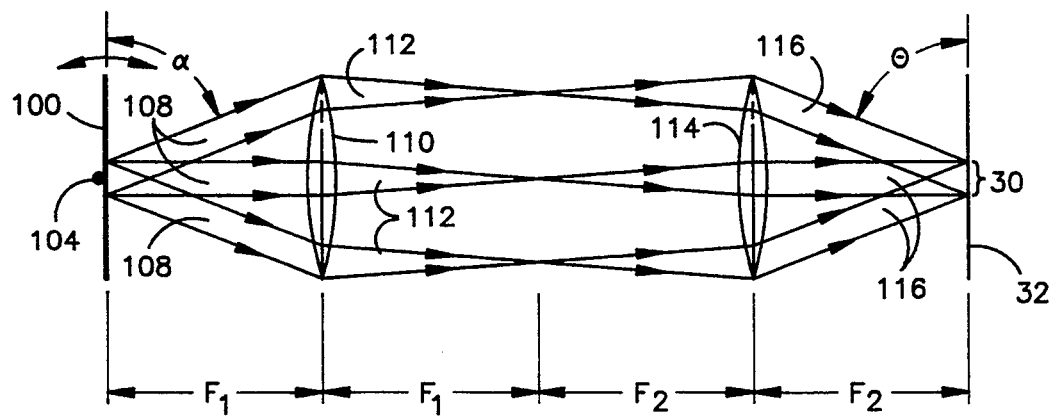
*fig.7*
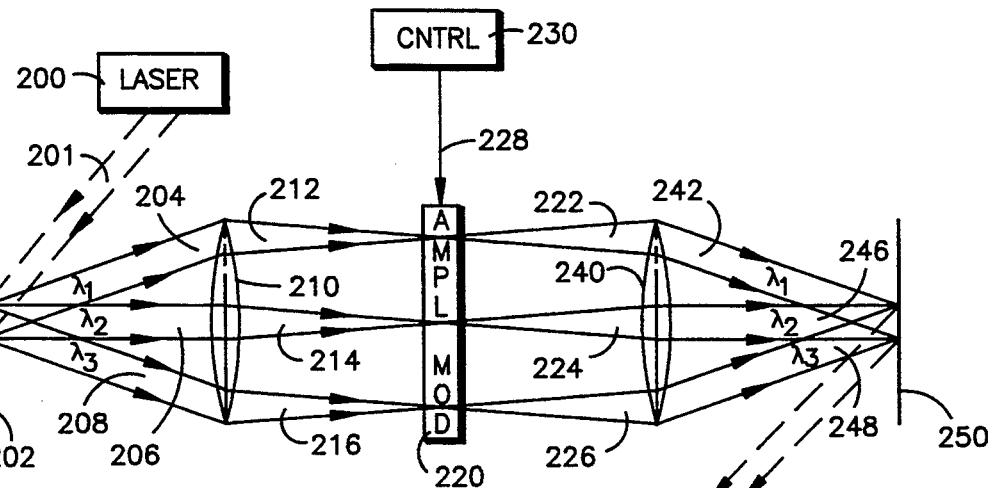
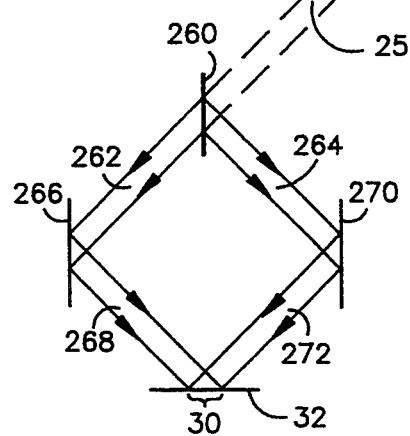

METHOD AND APPARATUS FOR FORMING APERIODIC GRATINGS IN OPTICAL FIBERS

DESCRIPTION

1. Technical Field

This invention relates to Bragg gratings and, more particularly, to aperiodic gratings in optical fibers.

2. Background Art

Reflective gratings, as is known, have numerous applications in the areas of optical sensing and signal processing. Also, it is known to impress refractive index (or Bragg) reflection gratings, having a uniform spatial periodicity, in the core of a germania doped optical fiber, as is discussed in U.S. Pat. Nos. 4,807,950 and 4,725,110 both to Glenn et al. A Bragg grating having a uniform spatial periodicity of refractive index variations or perturbations acts as a narrow wavelength band reflector at wavelengths equal to twice the grating spacing (i.e., the spacing between successive index perturbations).

Also, the width of the reflection peak is determined by the amplitude of the refractive index variations or perturbations (i.e., the "strength" of the grating) and the effective length of the grating i.e., the length over which the incident light has dissipated to substantially zero).

In particular, for low amplitude index variations (i.e., "weak" gratings), the width of the reflection peak is very narrow because, as the input light is incident on successive perturbations, due to the small change in refractive index, only a small portion of the incident light is reflected. Thus, the source light is only slightly depleted. As a result, the total reflected light comprises a small amount of light reflected from many successive perturbations which add coherently (due to their spacing) to produce a strong reflected signal at the peak reflection wavelength (i.e., twice the grating spacing). It should be understood that the effective (optical) length of the grating, i.e., the length it takes for the light to completely dissipate, is not necessarily equal to (and is generally shorter than) its physical length.

However, as the wavelength of the source light changes from twice the grating spacing (where peak reflectivity occurs), destructive interference quickly begins to occur between light beams reflected from the various perturbations due to phase differences caused because the spacing between successive perturbations are no longer equal to half the incident wavelength.

Conversely, for large amplitude index variations (i.e., "strong" gratings) a large amount of light is reflected from each grating. Thus, the input light is significantly depleted by each perturbation. Consequently, the effective length of the grating is much shorter than with weak gratings. As a result, the input wavelength may deviate more from twice the grating spacing before destructive interference begins to occur. Thus, the width of the reflection peak for strong gratings is typically wider than that for weak gratings.

As is known, the formation of gratings in a fiber is the result of a photo-refractive effect. In particular, when the core of a photosensitive fiber is exposed to ultra-violet radiation at a wavelength near 250 nanometers, a permanent change in the refractive index is produced. The magnitude of the change is related to the intensity of the incident radiation and the time of exposure. As discussed in the aforementioned patents, a grating with a uniform spatial periodicity can be produced by allowing two nominally plane optical waves to interfere within the core of the fiber, thereby producing an interference pattern therein. The uniform sinusoidal intensity variation of the interference pattern produces a grating having a uniform spatial period of refractive index variations similar to the sinusoidal variations of the interference pattern.

However, while having a narrow reflection band is useful for some applications, there may be other applications which contemplate the use of a filter function which is wider than that achievable with the aforementioned strong gratings, or has a different shape than merely a simple single peak narrow reflection band.

Therefore it would be desirable to provide a Bragg grating having a reflectivity profile which is not merely a narrow band single peak.

DISCLOSURE OF INVENTION

Objects of the invention include provision of a Bragg grating having a selectable filter-function profile.

According to a first aspect of the present invention a method of impressing an aperiodic grating includes the steps of taking an optical waveguide made of a material which has a refractive index that can be permanently changed by exposure to light of a predetermined intensity at a predetermined wavelength and simultaneously exposing the waveguide to two writing light beams which intersect and interfere in a predetermined region of the waveguide so as to create an interference pattern along a longitudinal axis of the waveguide for a time long enough to form a permanent refractive index variation in the waveguide, each of the two writing beams have a predetermined number of wavelengths, each wavelength is sufficiently different from each other so as to cause the refractive index variation to be an aperiodic variation.

According further to the first aspect of the invention, each of the wavelengths in the step of exposing comprises a Fourier component of the aperiodic refractive index variation.

According to a second aspect of the present invention, an apparatus for impressing an aperiodic grating into a region of an optical waveguide, includes light source means, for providing a predetermined number of source beams, each beam having a predetermined wavelength; wavelength combining means for combining the source beams into a single beam; beamsplitting means for splitting the single beam into at least two writing beams; and beam directing means for directing the writing beams so as to intersect on a region of the waveguide, thereby creating an interference pattern along a longitudinal axis of the waveguide for a time long enough to form a permanent refractive index variation in the waveguide, the wavelengths associated with the source beams are sufficiently different from each other so as to cause the refractive index variation to be an aperiodic variation.

According further to the second aspect of the invention the light source means includes broadband light source means for providing a broadband source light having a plurality of wavelengths and wavelength separation means, for separating the broadband light into the predetermined number of beams.

The invention represents significant improvements over the prior art Bragg gratings by providing a method and apparatus for making an aperiodic refractive index variation (i.e., an aperiodic grating) along the length of an optical waveguide such as an optical fiber. Such aperiodic gratings allow for the reflectivity profile of the grating to be tailored to match some specific predetermined wavelength profile characteristic. In one embodiment, the periodicity of refractive index variation, and hence the grating, is varied by changing the wavelength, the amplitude, and/or the phase of the interfering beams, and/or their angle of intersection within the fiber. By adjusting these parameters of the writing beams it is possible to sequentially build-up the desired variation in periodicity by a process of Fourier synthesis. Thus, each interference pattern is a Fourier component of the overall aperiodic index variation.

In an alternative embodiment, an aperiodic grating is written with all the Fourier components, or a portion thereof, simultaneously, by using a spectral filter which separates-out the desired wavelengths, alters the amplitude of each wavelength in a predetermined manner (and/or phase shifts of each wavelength), and recombines the individual Fourier components into a single beam which is then used to write the grating. In the former technique, the writing is done sequentially and in the latter technique the Fourier components are impressed simultaneously.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 1 is a schematic block diagram showing amplitude and phase modulation to write an aperiodic grating, in accordance with the present invention.

FIG. 2 is a blown-up side view of a fiber and two beams which intersect and interfere in a region of the fiber.

FIG. 4 is a graph of the reflectivity profile associated with the aperiodic grating of FIG. 3, illustration (e), in accordance with the present invention.

FIG. 5 is a block diagram of an alternative embodiment of the present invention having scanning mirrors to adjust the angle of intersection where the grating is written in the fiber, in accordance with the present invention.

FIG. 6 is a blown-up view of the scanning mirror and optical elements of the embodiment of FIG. 5, in accordance with the present invention.

FIG. 7 is a schematic block diagram of an alternative embodiment of the present invention using simultaneously writing all the Fourier components to form an aperiodic grating, in accordance with the present invention.

BEST MODE FOR CARRYING OUT THE INVENTION

Figure 3A:
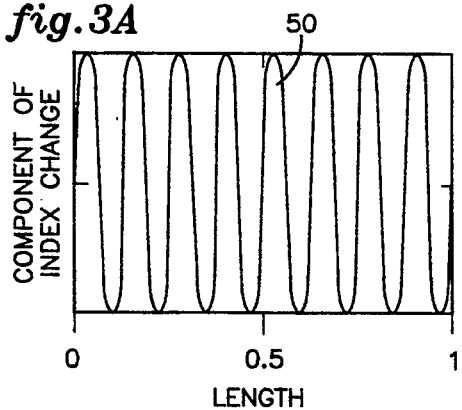
FIG. 3 is a plurality of waveforms in illustrations (a),(b),(c),(d),(e), showing a plurality of Fourier components of refractive index variation along a longitudinal axis of a waveguide and a resultant summation of these components which exists after all the components are written into a fiber, in accordance with the present invention.

Referring now to FIG. 1, a tunable wavelength laser 10 provides a source beam 12 having a wavelength based on a signal on a line 14 from a controller 16 (discussed hereinafter). The light 12 is incident on an amplitude modulator 18, e.g., an electro-optic amplitude modulator or a spatial light modulator. The amplitude modulator 18 adjusts the amplitude of the input light signal 12 and provides a light signal 20 having an amplitude in response to an amplitude control signal on a line 21 from the controller 16.

The amplitude adjusted light signal 20 is incident on a beamsplitter 22, which passes a predetermined percentage, e.g., 50%, of the input light 20 as a passed light 24 and reflects the remaining portion as a reflected light 25. The passed light 24 is incident on a mirror 26 which provides a reflected beam 28. The beam 28 is incident on a region 30 of an optical fiber 32, e.g. a germania-doped silica-core fiber.

The reflected beam 25 is incident on a phase modulator 34, e.g., an elecro-optic phase modulator, which provides an output beam 36 being phase shifted from the input beam 25 in response to a signal on a line 38 from the controller 16. The phase shifted beam 36 is incident on a mirror 40 which provides a reflected beam 42. The reflected beam 42 is also incident on the region 30 of the optical fiber 32 and intersects with and interferes with the beam 28. Alternatively, a fixed phase modulator may be used if desired, such as a phase plate. It should be understood that the phase modulator 34 may alternatively be placed in the path of the beams 24, 28, or 42.

The controller comprises known electronic, digital and/or analog circuitry, or it may likely be a digital computer, having the appropriate signal processing and memory capability to provide the functions discussed herein.

As discussed hereinbefore, and in the aforementioned US Patents to Glenn et al, a Bragg grating is embedded into the core of an optical fiber by interfering two coherent beams in the region of the fiber core where the grating is desired. The resulting interference pattern is a standing wave which exists along the fiber length (or longitudinal axis) which causes a corresponding spatially periodic variation in refractive index along the longitudinal axis of the fiber (discussed hereinbefore). The spatial periodicity if the refractive index variation (and hence the grating) is a function of the wavelength of the two incident light beams 28,42. To aid in altering each component of the refractive index, the amplitude and phase of each component may be adjusted, however, this is not required, provided the source is wavelength variable. Also, instead of the amplitude modulator 18, the laser source 10 may have variable output power which is controlled by the controller 16.

Referring now to FIG. 2, the beams 28,42 are either collimated or focussed to a line (using cylindrical lenses—not shown) and intersect at the region 30 of the core of the fiber 32. The region 30 is where the periodic interference pattern is formed which creates the periodic variation of refractive index.

Figure 3B:
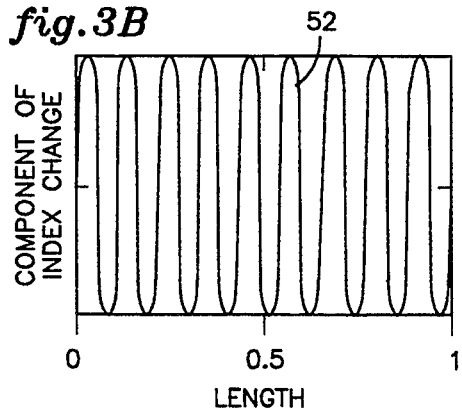
Figure 3C:
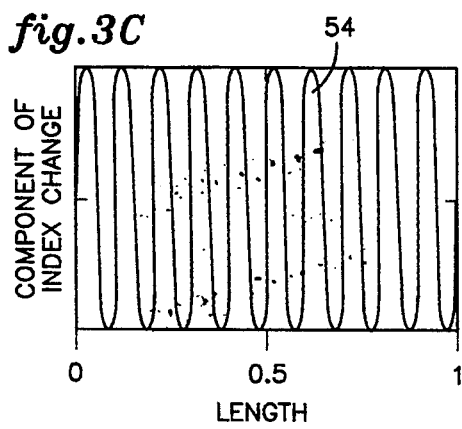
Figure 3D:
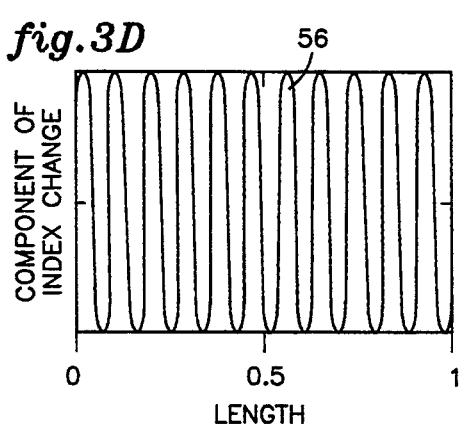
Figure 3E:
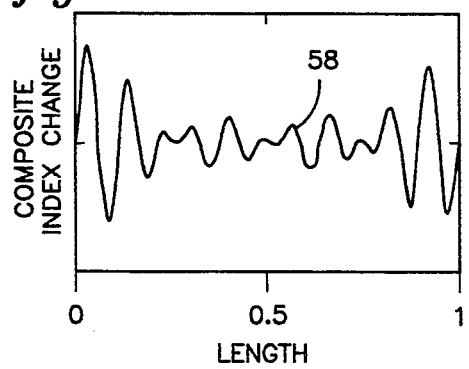

Referring now to FIG. 3, we have found that by performing successive writings of interference patterns having different amplitude, phase and frequency of spatial variations (and thereby producing correspondingly different periodic refractive index variations), an aperiodic refractive index profile can be created, thereby allowing for filter shapes other than a single narrow band reflection filter.

In particular, if each of the refractive index profiles along the longitudinal or z-axis of the fiber indicated in FIG. 3, illusts. (a)–(d) are written successively into the core of the fiber, then the resultant permanent refractive index variation profile is as indicated in FIG. 3, illust.

(e), which is simply the sum of the individual Fourier components (in FIG. 3, illusts. (a)–(d)). Such an index variation profile provides a wide bandwidth filter profile 60, shown in FIG. 4.

Using the principle of superposition, each of the waveforms 50–56 of FIG. 3, illusts. (a)–(d), respectively, reflects a narrow wavelength band of light related to the grating spacing, and are indicated by the individual profiles 62–66, respectively. Thus, when each of these waveforms are impressed in the fiber core, the resultant filter profile is the broadband filter function 60. It should be understood that other filter function profiles may be created by using different Fourier-component refractive index variation waveforms.

Also, as is known, the reflectivity profile (e.g., FIG. 4) is the Fourier transform of the refractive index profile when the amplitude of the variation is small (i.e., for "weak" gratings), e.g., FIG. 3, illust. (e)). For more information regarding this Fourier transform relationship see H. Kogelnik, "Filter Response of Nonuniform Almost Periodic Structures", Bell System Tech. Journal, Vol. 55, No. 1 (January 1976). Thus, one can obtain the desired aperiodic refractive index variation profile by taking the inverse Fourier transform of the desired reflectivity characteristic and taking the Fourier transform of the resultant aperiodic index profile (with respect to length), to determine the individual refractive index Fourier components needed to be written to create such a reflectivity function.

Referring again to FIG. 1, to create the refractive index profile 58 shown in FIG. 3, illust. (e), the controller 16 controls the tunable laser 10, the amplitude modulator 18, and the phase modulator 34 to create each of the Fourier components of the waveforms 50–56 of FIG. 3, illusts. (a)–(d), sequentially in time.

More specifically, the controller 15 sets the wavelength of the tunable laser 10, the level of attenuation of the amplitude modulator 18, and the amount of phase delay of the phase modulator 34 to provide the beams 28,42 with the appropriate amplitude and phase so as to create the refractive index waveform 12 of FIG. 3, illust. (a). These conditions are held constant for a predetermined period of time long enough to write this refractive index variation pattern permanently into the core of the fiber 32, similar to that discussed in the aforementioned U.S. Patents. The amount of time, as is known, varies from seconds to minutes depending on the photo-sensitivity of the fiber and intensity of the exposing radiation.

Next, the controller adjusts the wavelength of the tunable laser 10, the amplitude modulator 18, and the phase modulator 34 so as to provide the beams 28,34 with the appropriate amplitude, phase, and wavelength to create the refractive index variation waveform 52 of FIG. 3, illust. (b), in the fiber 32. These settings are retained for sufficient lengths of time and at a sufficient intensity so as to provide a permanent index variation as indicated by the waveform 52 of FIG. 3, illust. (b).

A similar process is performed to create the refractive index variation waveforms 54,56 of FIG. 3, illusts. (c),(d), in the same region 30 of the fiber 32. The result is an overall refractive index profile such as that shown in FIG. 3, illust. (e).

Referring now to FIG. 5, as is known, the spatial periodicity of refractive index variation is also a function of the angle $\Theta$ of incidence of the two interfering beams on the fiber 32. Using this effect, the beams 24,36 are incident on scanning mirrors 100,102 which pivot about axes 104,106, respectively (instead of being incident on the stationary mirrors 26,40, discussed hereinbefore with FIG. 1). Also, for this embodiment, the laser source need not be a variable wavelength source and the amplitude and phase modulation is not required, however, may still be used to vary additional variables, if desired.

Referring now to FIGS. 5 and 6, the mirror 100 provides a reflected collimated beam 108 having an angle $\alpha$ relative to the angle of the mirror 100. The beam 108 is incident on a lens 110 which focusses and directs light entering the lens from various different angles to provide output light 112 having substantially parallel central rays. The light 112 is incident on a collimating lens 114, which collimates and directs the light 112 as an output light 116 to a region 30 of the fiber 32 which is located at the focal plane of the lens 114.

The distance between where the light 108 leaves the mirror 100 and the lens 110 is equal to the focal length f1 of the lens 110. The distance between the lens 114 and the fiber 32 is equal to the focal length f2 of the lens 114. Also, the distance between the lens 110 and the lens 114 is equal to the sum of the two focal lengths f1,f2 of the lenses 110,114, respectively. To have a change in the angle $\alpha$ cause the same change in the angle $\Theta$ onto the fiber, the focal lengths f1,f2 should be the same; however, this is not required for the invention to operate.

Referring to FIG. 5, a similar arrangement exists between the adjustable mirror 102 and the fiber 32. In particular, a light 120 is reflected from the mirror 102 and is incident on a focussing and redirecting lens 122 which provides a focussed output light 124 (similar to the focussed beam 112 of FIG. 6). The focussed light 124 is incident on a collimating lens 126 which provides a collimated light beam 128 onto the region 30 of the fiber 32.

Referring now to FIG. 7, a broadband laser source 200 provides a beam 201, having a broad wavelength band which includes wavelengths of the desired Fourier spectrum. The beam 201 is incident on a diffraction grating 202, which, as is known, diffracts light so as to spatially separate various wavelengths existing in the light beam 201. In particular, the diffraction grating 202 provides a diffracted light 204, having a wavelength of $\lambda 1$. The diffraction grating also provides a beam 206, having a wavelength of $\lambda 2$, and a beam 208, having a wavelength of $\lambda 3$. More wavelengths may be used if desired.

The beams 204–208 are incident on a focussing lens 210 which converts the collimated beams 204–208 to focussed beams 212–216, respectively, having substantially parallel central rays (as is indicated in FIG. 5).

The beams 212–216 are incident on an amplitude modulator 220, e.g., a spatially varying transparency or a spatial light modulator. The spatial light modulator 220 alters the intensity of the beams 212–216 in a selective manner based on the location that a given light is incident on the modulator 220. The spatial light modulator provides amplitude adjusted light beams 222–226 in response to a control signals on lines 228 from a controller 230. The controller 230 is similar to the controller 56 discussed hereinbefore and sets the value of the amplitude of each of the beams 222–226 used to make the grating. Alternatively, the spatial light modulator 220 may be a passive transparency sheet having varying regions of opaqueness.

The beams 222–226 are incident on a lens 240 which collimates the beams 234–238 as the beams 242–248, respectively, and directs the beams onto a common region of a diffraction grating 250. The diffraction grating 250, combines the beams 242-248 to a single output beam 252.

The optical components of the diffraction grating 202, the lenses 210,240, the amplitude and phase modulators 220,232, and the grating 250, essentially make up a spectral filter which adjusts the amplitude and phase of the individual Fourier components of the desired aperiodic refractive index variation. Also, the lenses 210,240 are in essentially the same configuration as that of FIG. 6.

The beam 252 is incident on a beamsplitter 260 similar to the beamsplitter 22 (FIG. 1), discussed hereinbefore. The beamsplitter 260 passes a beam 262 and reflects the remaining portion of the input beam 252 as the beam 264. The beam 262 is incident on a mirror 266, which provides a reflected beam 268 onto the region 30 of the fiber 32. The reflected beam 264 is incident on a mirror 270, which provides a reflected beam 272 onto the region 30 of the fiber 32. The beams 268,272 intersect in the region 30 of the fiber 32 similar to that shown in FIG. 2 for the beams 28,42.

The embodiment shown on FIG. 7 provides simultaneous writing of all the Fourier spectral components that make-up the desired refractive index waveform profile. This embodiment has the advantage of reduced time to write the desired aperiodic grating as well as being less susceptible to stability vibration and air current problems associated with performing repeated writing in a sequential fashion. In particular, the distances between mirrors and the orientations of the lenses and mirrors relative to each other must remain precisely fixed in order for the multiple sequential spectral Fourier components to provide the desired combined refractive index waveform.

It should be understood that when the wavelengths are closely spaced, there will actually be some overlap of the focussed beams 212-216. Thus, the modulator 220 should be placed close to the focal points of the beams 212-216, as indicated in FIG. 7.

Also, if phase modulation is desired, the amplitude adjusted beams 222-226 may be incident on a phase modulator (not shown), e.g., an electro-optic modulator located between the amplitude modulator 220 and the lens 240. In that case, the mirrors 210,240 may be cylindrical, the beams 222-226 may be focussed to a line, the phase modulator would modulate a portion of each focussed line, an optical element (not shown) would split each beam and another optical element would direct the beams onto the fiber. Also in that case, the controller 230 would set the amount of phase shift in each beam and the optical elements 260,266,270 would not be used.

Instead of using the single broadband source 200 and the diffraction grating 202, a plurality of single wavelength sources (not shown) may be used to provide the beams 204-208, each being incident on the lens 210.

It should be understood that although various beams have been described as collimated, the invention will work equally well if the beams are focussed to a line. In that case, cylindrical lenses (not shown) should be used, however, the drawings in FIGS. 2, 6, and 7 of the beams would not change.

Also, it should be understood that the Fourier components of the desired aperiodic refractive index variation have frequencies which are very close to each other, i.e., not harmonics of each other.

Further, the invention will work equally well with waveguides other than an optical fiber, such as a planar waveguide, provided the waveguide is made of a material having an index of refraction which can be permanently changed by exposing the waveguide to light of a predetermined intensity at a predetermined wavelength.

Still further, for the embodiment of FIG. 7, instead of using the beam splitter 260 to split the beam 252 into two writing beams 268,272, a pair of the spectral filters and diffraction gratings 202,250 may be used each producing a beam which is directed onto the fiber 32 to form the grating.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A method of impressing an aperiodic grating, comprising the steps of:
   obtaining an optical waveguide made of a material which has a refractive index that can be permanently changed by exposure to light of a predetermined intensity at a predetermined wavelength; and
   simultaneously exposing the waveguide to two writing light beams which intersect and interfere in a predetermined region of the waveguide so as to create an interference pattern along a longitudinal axis of the waveguide for a time long enough to form a permanent refractive index variation in the waveguide, each of said two writing beams having a predetermined number of wavelengths, each wavelength being sufficiently different from each other so as to cause said refractive index variation to be an aperiodic variation.

2. The method of claim 1 wherein each of said wavelengths in said step of exposing comprises a Fourier component of said aperiodic refractive index variation.

3. The method of claim 1 further comprising a step of modulating the amplitude of a predetermined number of said wavelengths.

4. The method of claim 1 wherein said aperiodic refractive index variation exhibits a broadband reflectivity profile.

5. An apparatus for impressing an aperiodic grating into a region of an optical waveguide, comprising=
   light source means, for providing a predetermined number of source beams, each beam having a predetermined wavelength;
   wavelength combining means, for combining said source beams into a single beam;
   beamsplitting means for splitting said single beam into at least two writing beams; and
   beam directing means for directing said writing beams so as to intersect on a region of the waveguide, thereby creating an interference pattern along a longitudinal axis of the waveguide for a time long enough to form a permanent refractive index variation in the waveguide, the wavelengths associated with said source beams being sufficiently different from each other so as to cause said refractive index variation to be an aperiodic variation.

6. The apparatus of claim 5, wherein said light source means comprises:

broadband light source means for providing a broadband source light having a plurality of wavelengths; and wavelength separation means, for separating said broadband light into said predetermined number of source beams.

7. The apparatus of claim 5, further comprising amplitude modulation means, for independently modulating the amplitude of each of said source beams.

8. The apparatus of claim 7, further comprising signal processing means for providing an amplitude modulation signal to said amplitude modulation means and for determining the desired amplitude of each of said source beams.

9. The apparatus of claim 5, wherein said aperiodic variation exhibits a broadband reflectivity profile.

10. An apparatus for impressing an aperiodic grating into a region of an optical waveguide, comprising:

variable wavelength light source means, for providing a variable wavelength source light;

beamsplitting means for splitting said source light into at least two writing beams;

beam directing means for directing said writing beams so as to intersect on a region of the optical waveguide, thereby creating an interference pattern along a longitudinal axis of the waveguide, for a time long enough to form a permanent refractive index variation in the waveguide; and signal processing means for providing a wavelength control signal to said variable wavelength light source means, for setting different successive wavelengths, each wavelength forming a different refractive index variation, so as to create a total refractive index variation which is an aperiodic variation.

11. The apparatus of claim 10, further comprising amplitude modulation means, for independently modulating the amplitude of said source light.

12. The apparatus of claim 11, further comprising signal processing means for providing an amplitude modulation signal to said amplitude modulation means and for determining the desired amplitude of said source light.

13. The apparatus of claim 10, further comprising phase modulation means, for independently modulating the phase of at least one of said writing beams.

14. The apparatus of claim 13, further comprising signal processing means for providing a phase modulation signal to said phase modulation means and for determining the phase relationship between said writing beams.

15. The apparatus of claim 10, wherein said aperiodic variation exhibits a broadband reflectivity profile.

16. An apparatus for impressing an aperiodic grating into a region of an optical waveguide, comprising:

light source means, for providing a source light having a predetermined wavelength;

beamsplitting means for splitting said source light into at least two writing beams;

variable beam directing means for directing said writing beams so as to intersect on a region of the optical waveguide at a predetermined angle of incidence thereon, thereby creating an interference pattern along a longitudinal axis of the waveguide, for a time long enough to form a permanent refractive index variation in the waveguide; and signal processing means for providing a wavelength control signal to said variable beam directing means, for setting different successive angles of incidence, each angle causing a different refractive index variation to form, so as to create a total refractive index variation which is an aperiodic variation.

17. The apparatus of claim 16, further comprising amplitude modulation means, for independently modulating the amplitude of said source light.

18. The apparatus of claim 17, further comprising signal processing means for providing an amplitude modulation signal to said amplitude modulation means and for determining the desired amplitude of said source light.

19. The apparatus of claim 16, further comprising phase modulation means, for independently modulating the phase of at least one of said writing beams.

20. The apparatus of claim 19, further comprising signal processing means for providing a phase modulation signal to said phase modulation means and for determining the phase relationship between said writing beams.

21. The apparatus of claim 16, wherein said aperiodic variation exhibits a broadband reflectivity profile.

* * * * *